(12) United States Patent
Madsen

(10) Patent No.: US 12,345,061 B2
(45) Date of Patent: Jul. 1, 2025

(54) RELATING TO REINFORCEMENT OF WIND TURBINE TOWERS

(71) Applicant: Vestas Wind Systems A/S, Aarhus N. (DK)

(72) Inventor: Rasmus Bøgelund Madsen, Risskov (DK)

(73) Assignee: Vestas Wind Systems A/S, Aarhus N. (DK)

( * ) Notice: Subject to any disclaimer, the term of this patent is extended or adjusted under 35 U.S.C. 154(b) by 175 days.

(21) Appl. No.: 17/618,537

(22) PCT Filed: Jun. 19, 2020

(86) PCT No.: PCT/DK2020/050178
§ 371 (c)(1),
(2) Date: Dec. 13, 2021

(87) PCT Pub. No.: WO2020/253928
PCT Pub. Date: Dec. 24, 2020

(65) Prior Publication Data
US 2022/0298820 A1    Sep. 22, 2022

(30) Foreign Application Priority Data
Jun. 21, 2019   (DK) ........................... PA 2019 70391

(51) Int. Cl.
*E04H 12/00* (2006.01)
*E04H 12/16* (2006.01)
(Continued)

(52) U.S. Cl.
CPC ........... *E04H 12/16* (2013.01); *E04H 12/342* (2013.01); *F03D 13/20* (2016.05); *E04H 12/085* (2013.01); *F05B 2240/912* (2013.01)

(58) Field of Classification Search
CPC ......... E04H 12/00; E04H 12/16; E04H 12/34; E04H 12/341; E04H 12/342;
(Continued)

(56) References Cited

U.S. PATENT DOCUMENTS 1,919,491 A * 7/1933 Waggoner ............... E04H 12/12
52/649.4
6,722,091 B1 * 4/2004 Leslie ..................... E04G 21/10
52/249

(Continued)

FOREIGN PATENT DOCUMENTS

CN       106164396 A      11/2016
CN       112576449 A *    3/2021  ............. E04H 12/16
(Continued)

OTHER PUBLICATIONS

Danish Patent and Trademark Office, Search and Examination Report in PA 2019 70391, Jan. 21, 2020.
(Continued)

*Primary Examiner* — Chi Q Nguyen
(74) *Attorney, Agent, or Firm* — Wood Herron & Evans LLP

(57) ABSTRACT

A tower section for a wind turbine is provided. The tower section includes a tensioning arrangement having at least one tensioning device attached to three or more attachment points associated with the tower section. The attachment points are located proximate to an end of the tower section. The or each tensioning device is under tension and provides radial stiffness to the tower section. A method for assembling a tower for a wind turbine is also provided. The method includes providing a tower section, attaching a tensioning arrangement including at least one tensioning device between three or more attachment points associated with the tower section and located proximate to an end thereof, and (Continued)

applying tension to the at least one tensioning device so as to provide radial stiffness to the tower section.

26 Claims, 6 Drawing Sheets

(51) Int. Cl.
*E04H 12/34* (2006.01)
*F03D 13/20* (2016.01)
*E04H 12/08* (2006.01)

(58) Field of Classification Search
CPC ... E04H 12/344; E04H 12/345; E04H 12/347; E04H 12/085; F03D 13/20; F03D 13/2005; F03D 13/201; F05B 2240/912
See application file for complete search history.

(56) References Cited

U.S. PATENT DOCUMENTS

| | | | |
|---|---|---|---|
| 8,641,369 B2 | 2/2014 | Rodriguez Tsouroukdissian | |
| 8,801,335 B2* | 8/2014 | Schacknies | F03D 13/22 |
| | | | 405/256 |
| 9,617,704 B2* | 4/2017 | Kent | E04C 5/0645 |
| 9,828,787 B1* | 11/2017 | Thiessen | E04G 21/24 |
| 9,964,097 B2* | 5/2018 | Dagher | B63B 5/20 |
| 10,006,203 B2* | 6/2018 | Cordero | B66C 11/06 |
| 10,215,161 B2* | 2/2019 | Viselli | B63B 35/003 |
| 10,513,866 B2* | 12/2019 | Brandão | E04H 12/34 |
| 2005/0166521 A1* | 8/2005 | Silber | E04H 12/10 |
| | | | 52/651.01 |
| 2006/0062676 A1* | 3/2006 | Jakubowski | B63B 35/44 |
| | | | 416/244 R |
| 2007/0125037 A1 | 6/2007 | Meiners | |
| 2010/0132282 A1 | 6/2010 | Voss | |
| 2010/0150663 A1* | 6/2010 | Torres Martinez | E02D 27/425 |
| | | | 405/222 |
| 2011/0061321 A1* | 3/2011 | Phuly | F03D 13/22 |
| | | | 52/297 |
| 2011/0155038 A1* | 6/2011 | Jahnig | F03D 13/25 |
| | | | 114/264 |
| 2012/0014752 A1* | 1/2012 | Caruso | B63B 35/44 |
| | | | 405/211 |
| 2012/0107065 A1* | 5/2012 | Peterson | B60P 7/12 |
| | | | 410/47 |
| 2013/0019792 A1* | 1/2013 | Jahnig | B63B 3/04 |
| | | | 114/267 |
| 2013/0212963 A1* | 8/2013 | Miks | E02D 27/425 |
| | | | 52/223.13 |
| 2013/0212972 A1* | 8/2013 | Kawabata | F03D 13/20 |
| | | | 52/651.01 |
| 2016/0201653 A1* | 7/2016 | Holscher | E02D 27/425 |
| | | | 405/252 |
| 2017/0183872 A1* | 6/2017 | Cordero | E04C 5/08 |
| 2017/0241152 A1* | 8/2017 | Unanua Hermoso De Mendoza | F03D 3/062 |
| 2018/0112371 A1 | 4/2018 | Garduno Estebanez et al. | |
| 2018/0178708 A1* | 6/2018 | Stuart | B60P 7/12 |
| 2019/0136566 A1 | 5/2019 | Viselli et al. | |
| 2020/0003183 A1* | 1/2020 | Rothers | F03D 13/20 |
| 2022/0099065 A1* | 3/2022 | Stuart | F03D 13/40 |
| 2022/0170445 A1* | 6/2022 | Knoop | F03D 13/10 |

FOREIGN PATENT DOCUMENTS

| | | |
|---|---|---|
| DE | 102010048547 A1 | 4/2012 |
| EP | 3179099 A1 | 6/2017 |
| EP | 3492736 A1 | 6/2019 |
| WO | 2010129642 A2 | 11/2010 |
| WO | 2021056923 A1 | 4/2021 |

OTHER PUBLICATIONS

European Patent Office, International Search Report and Written Opinion in PCT Application No. PCT/DK2020/050178, Sep. 22, 2020.
China National Intellectual Property Administration. Office Action issued in corresponding Chinese Patent Application No. 202080056756.1, mailed Apr. 14, 2023.
European Patent Office, communication issued in corresponding EP Application No. 20740530.9, dated Mar. 18, 2024.

\* cited by examiner

RELATING TO REINFORCEMENT OF WIND TURBINE TOWERS

FIELD OF THE INVENTION

This invention generally relates to wind turbine towers and, in particular, to an approach for improving the stiffness of a wind turbine tower section during transport, installation, and use.

BACKGROUND

A conventional design of a horizontal axis wind turbine comprises a tower that is supported on a foundation in the ground, and on top of which is mounted a nacelle which houses power generating equipment and supports a rotor including a set of blades. A common construction approach is to construct the wind turbine tower from tubular sections. Such sections may be concrete or steel, but steel is more common today and it is in this context the invention is directed.

To manufacture a steel wind turbine tower, tubular tower sections are transported to the installation site and are assembled step by step to form the complete tower. Typically, each tower section is provided with flanges with which the individual tower sections can be fastened together, usually with a series of circumferentially spaced bolts.

Typically, a wind turbine tower makes up a significant proportion of the total mass of the wind turbine, and so is a hugely expensive component to fabricate and install. The current trend is towards lighter and taller towers, both for cost reasons and to access higher wind speeds, which can result in more flexible towers with thinner wall sections. Since tower sections tend to be transported in a horizontal orientation, one consequence of lighter-weight tower construction is that the tower section may deform laterally under its own weight. As mitigation, it is known to brace tower sections with heavy steel bracing structures which are put in position temporarily for the duration of transport and are then removed for installation. However, steel is expensive and such items are cumbersome to handle.

It would therefore be desirable to have an improved approach for reinforcing relatively light weight tower sections during transportation and assembly. It is against this background that the invention has been devised.

SUMMARY OF THE INVENTION

According to a first aspect of the invention, there is provided a tower section for a wind turbine. The tower section comprises a tensioning arrangement comprising one or more tensioning devices attached to three or more attachment points associated with the tower section, wherein those attachment points are located proximate to an end of the tower section. The one or more tensioning devices are under tension and provide radial stiffness to the tower section.

The tower section may be cylindrical in form being defined by a circular side wall defining open ends. Those open ends may be provided with flanges with which that tower section may be connected to other tower sections.

By increasing the radial stiffness of the tower section, the tensioning devices make the tower section more resistant to deformation both when assembled as part of a tower, and in transportation, when, as described above, tower sections often lie on their sides and can deform under their own weight. This advantage is particularly significant during erection of the tower, when it is important that adjoining tower sections are matched in their cross-sectional geometry. The tensioning arrangement therefore ensures that neighbouring ends of tower sections that are to be connected to one another define circular cross sections that are readily able to be bolted together. By spanning between three or more attachment points, a more sophisticated stress state in the tower section is created that allows for stiffening in multiple radial directions, providing a balanced radially inward force circumferentially about the tower. This improves the ability of the tensioning devices to stiffen the tower sections and prevent deformations in shape from occurring.

In embodiments, the attachment points are located in the same or nearly the same transverse plane of the tower section, that transverse plane being perpendicular to the central axis of the tower section.

The phrase 'the same transverse plane' is meant to be interpreted functionally, as there may be some slight vertical offset between the attachment points relative to one another. However, it is anticipated that some deviation from being in the same plane is acceptable.

At least one of the attachment points may be integral with the tower section. Alternatively, at least one of the attachment points may be provided by an additional component separate to the tower section. The additional component may be a flange that affixes to the tower section. At least one of the attachment points may be associated with an interior surface of the tower section.

The attachment points may take the form of brackets to which the tensioning device is attached. Any suitable mechanical fastening system may be used, such as bolts or welding. The brackets may either be integral with or removably attached to the tower section.

The bolts may be attached to flanges that affixes to the tower section. More specifically, flanges at the open end of the tower section. The flanges are equipped with a plurality of holes for the bolts that hold the tower section to the foundation or another tower section upon assembly. The holes are vacant during until assembly and it is therefore convenient to use bolts temporarily inserted in the holes to temporarily attach the brackets to the tower section.

The attachment points allow for the tension applied to the tensioning device to create an opposing compressive force on the tower section that acts through the attachment points. Preferably the attachment points are located at or near to an end of the tower section within a distance that is less than 25% or the height of the tower section. More preferably within 10% or even 5% of the tower section height.

The tensioning devices may be configured such that the tension applied between attachment points is adjustable. This may be via a suitable mechanism such as a screw-based manual adjuster like a turnbuckle, or a more complex hydraulic or electrically-operated device.

By adjusting the tension applied to the tensioning devices, different environmental conditions may be accounted for by adjusting the stiffness of the tower section.

The tensioning devices may be linear members that spans between two attachment points. The tensioning devices may also span between two diametrically opposed attachment points or between two points so as to form a chord across the tower section. Alternatively, the tensioning devices may span between more than two attachment points.

According to a second aspect of the invention, there is provided a method for assembling a tower for a wind turbine. The method comprises providing a tower section, attaching a tensioning arrangement including at least one tensioning device between three or more attachment points associated with the tower section and applying tension to the at least one tensioning device so as to provide radial stiffness to the tower section.

Attaching the tensioning devices between the three or more attachment points associated with the tower section may comprise attaching the tensioning devices to an additional component via attachment points thereof and attaching the additional component to the tower section. The additional component may be an annular connecting flange component of the tower. The method may further comprise adjusting the tension applied to the tensioning device.

In an aspect of the invention a tower section is provided. The tensioning arrangement including at least one tensioning device between at least three attachment points associated with the tower section and located proximate an end thereof is attached to the tower section. Tension is applied to the at least one tensioning device so as to provide a radial stiffness to the tower section. Following the application of tension to the at least one tensioning device the tower section is lifted into position for assembly. The position for assembly may be with the tower section adjacent to the foundation interface or adjacent to a tower section already erected. The tower will be assembled from tower sections placed one on top of the other and supported by the foundation.

With this embodiment the duration of time when a tower section is suspended from the crane is limited as much as possible, because the interface can be adjusted with the at least one tensioning device prior to attaching the crane. The tower section can be directly attached to the adjacent tower section or foundation without time consuming adjustments. This provides for a safer and more economical assembling of the tower.

Further, in the method according to the invention, following the step of lifting the tower section into position for assembly the method comprises a step of attaching the tower section to one of the foundation or another tower section, and a following step of removing the tensioning arrangement.

The tension arrangement is temporarily installed and can therefore be reused when the assembly of the tower is complete.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above and other aspects of the invention will now be described, by way of example only, with reference to the accompanying drawings, in which.

In the drawings, the same reference numerals are used to denote features that are common across drawings.

SPECIFIC DESCRIPTION

Figure 1:
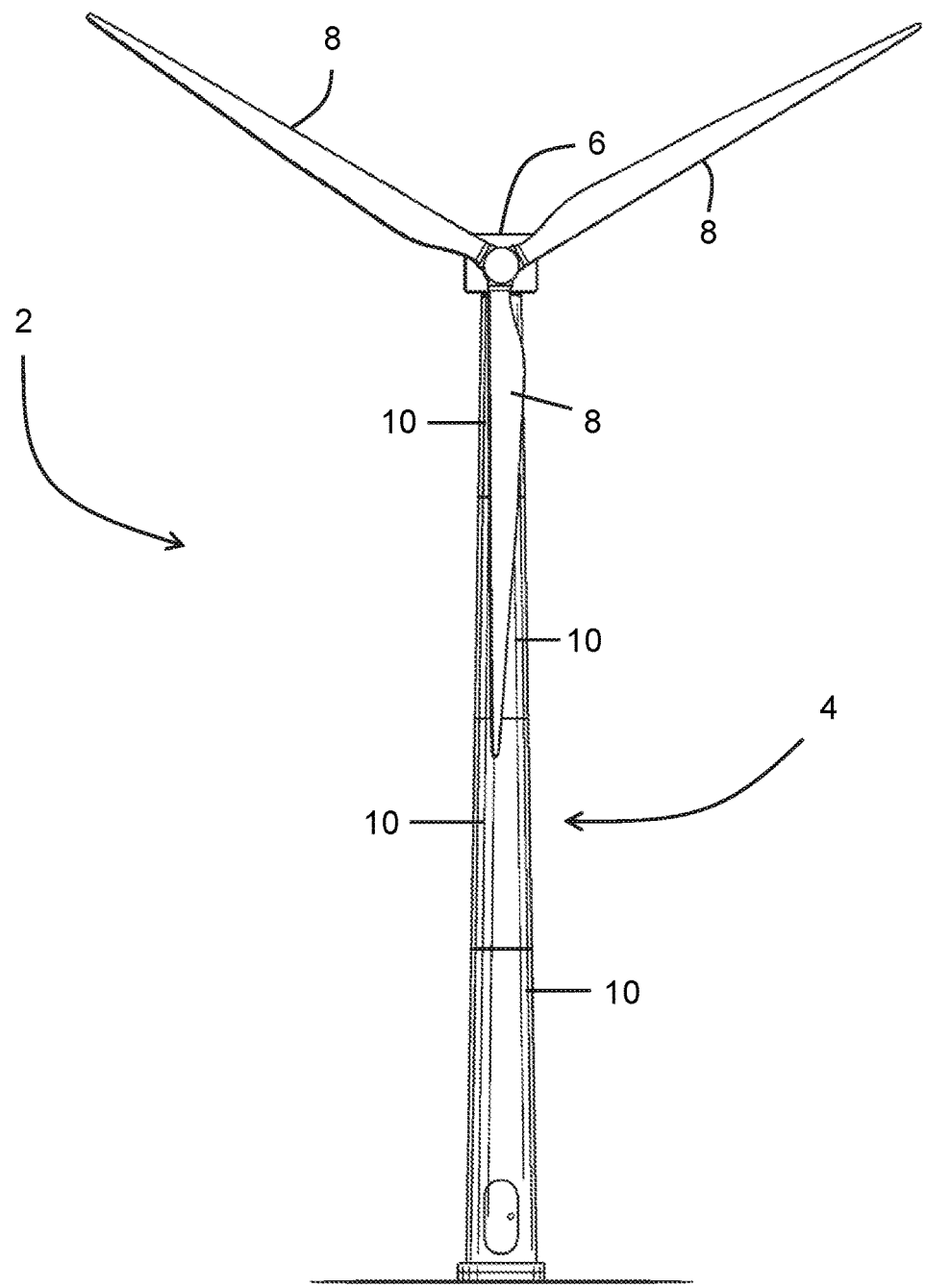
FIG. 1 is a schematic view of a wind turbine in which the embodiments of the invention may be implemented.

FIG. 1 shows a horizontal axis wind turbine 2 in which embodiments of the invention may be implemented. As the skilled person will recognise as being conventional, the wind turbine 2 comprises a tower 4, a nacelle 6 and a set of blades 8. The tower 4 is supported on a foundation in the ground (not shown) and the nacelle 6 is mounted on top of the tower 4. The nacelle 6 houses power generating equipment and a rotor, including a rotor hub 7, to which the blades 8 are attached.

As would be known to the skilled person, the tower 4 comprises a plurality of tower sections 10, arranged on top of each other. It is to be understood that the number of tower sections 10 included in the tower 4 is not a critical feature of the invention. Indeed, the tower 4 may comprise only one tower section 10 and still fall within the scope of the appended claims. The tower sections 10 are substantially cylindrical but are tapered slightly in the illustrated embodiment so as to have a slightly larger diameter at their base than at their top. To provide a context, in current manufacturing approaches, tower sections are typically around 10 to 30 metres in height, and around 3 to 6 metres in diameter.

Figure 2A:
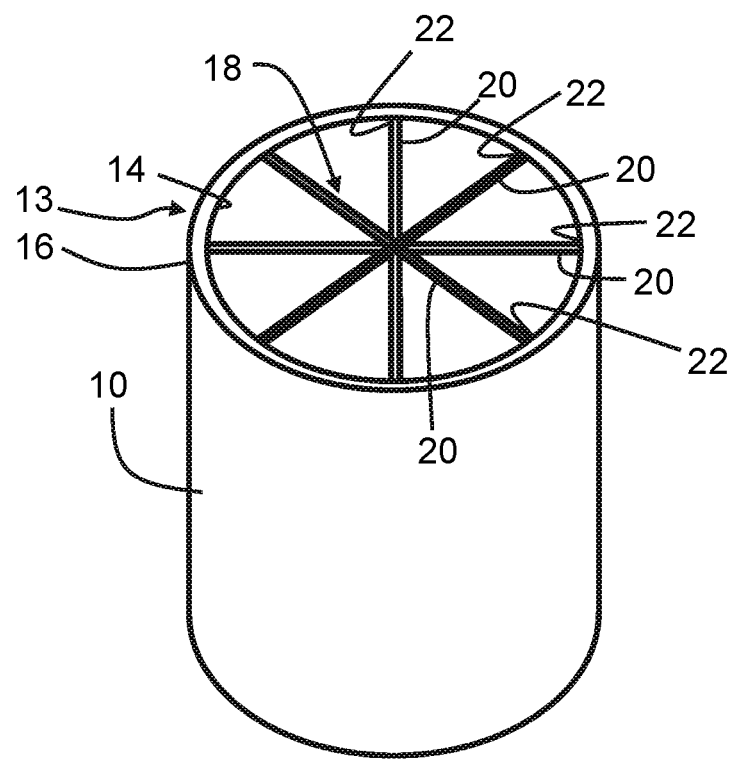
FIGS. 2a to 2c, FIGS. 3a to 3c and FIG. 4 are views of various embodiments of the invention.

Turning now to FIG. 2a, an illustrative but somewhat simplified view of one of the tower sections 10 is shown. The skilled person would appreciate that the tower section may comprise other components that are not illustrated here for the sake of clarity, for example access ladders, cable support brackets, floor joists and so on. The tower section 10 comprises a cylindrical tower wall 12 that defines an internal surface 14 and an external surface 16. The strength of the tower section 10 is largely derived from the thickness of the cylindrical wall, and so a lighter tower section with a thinner wall will inherently be more flexible in the transverse or radial direction. This means that the tower section is vulnerable to being deformed out of a true circular cross section. This is particularly the case during transportation where it is conventional to convey tower sections oriented horizontally, for example on the back of a flatbed trailer. In such a scenario, it will be appreciated that the tower section is susceptible to deforming into an oval shape under its own weight. However, such deformation may also occur during operation of the wind turbine.

The inventive concept addresses this problem by equipping the tower section with a tensioning arrangement, shown generally as 18, that applies a force to multiple points, zones or regions on the internal surface of the tower section. The force applied to those points is directed in a radially inwards direction, for example towards the centre of the tower, and preferably directed towards the tower axis. Significantly, the force applied to the tower at multiple points spaced at pre-determined angularly-spaced intervals enables the ovality of the tower to be controlled during transportation and tower construction, but also increases the in stiffness of the tower during use. This may be achieved in various ways, as will be described below with reference to the illustrated embodiments.

The tower section in FIG. 2a is equipped with an elegantly simple tensioning arrangement 18 which includes a plurality of a tensioning devices 20. Each of the tensioning devices 20 is connected to and therefore acts between two opposed respective attachment points 22 (not all of which are labelled on FIG. 2a, for clarity) associated with the internal surface 14 of the tower section 10. As shown, the tensioning devices 20 are attached to attachment points 22 that are located towards or proximate to the top end 23 of the tower section 10. The terms 'located towards' and 'proximate' should be interpreted functionally, and it is not intended that the attachment points 22 need to be located immediately next to the upper edge of the tower wall 12. From a broad perspective, locating the attachment points 22 at or near to the top end 13 of the tower section 10 means that tension is applied at a cross sectional plane where it is important that a circular cross section should be maintained because it is at the open top end 13 of the tower section 10 where it is connected to another tower section. It will be appreciated that this is most easily achieved if the two adjoining parts of the neighbouring tower sections are precisely circular in transverse cross section when they are mated. Functionally, therefore, the attachment points 22 should be located near to the top end 13 of the tower section 10 so as to achieve this objective, and the precise location may depend on the construction of the tower. For example, the objective might be achieved if the attachment points 22 are located within a distance from the top end 13 of the tower section that is 5% of the overall height of the tower section. In other embodiments, the objective might be achieved if the attachment points 22 are located within a distance that is 10%, or even 25% of the height of the tower section 10.

In other arrangements, however, the attachment points 22 may be located at other levels along the height of the internal surface 14 of the tower wall 12.

Preferably, each of the tensioning devices 20 is attached to diametrically opposed points as, in this arrangement, the radially inward force applied to the tower via the attachment points 22 is perpendicular to the wall and so is most effective at compensating for any deformation of the tower. In the illustrated embodiment, therefore, the tensioning devices 20 span across the central axis of the tower section 10. The number of attachment points 22 apply a radial force to the tower wall in many different radial planes which provides very effective control over the ovality of the increased stiffness of the tower section.

Each of the plurality of tensioning devices 20 extends across the centre of the tower at a different angle. As shown here, there are four separate tensioning devices 20 which are equi-angularly spaced. However, this is not essential, and the angular spacing could be unequal. It should also be noted that the attachment points 22 are located in the same or nearly the same transverse plane of the tower section 10, that transverse plane being perpendicular to the central axis of the tower section 10. The phrase 'the same transverse plane' is meant to be interpreted functionally, as there may be some slight vertical offset between the attachment points 22 relative to one another. However, it is anticipated that some deviation from being in the same plane is acceptable.

In this embodiment, each tensioning device 20 is a single arm-like linear member that may be a rigid element such as a rod made from metal or plastic, although any suitably rigid material would suffice. It is also envisaged that a flexible or resilient element such as a plastic (e.g. Nylon) or metal fabric would be acceptable. Where the tensioning device 20 is resilient, it may be stretched when attached to the respective attachment points 22 so that it applies a tensioning force to the tower section 10 when suitably attached to it. Similarly, a rigid rod-like tensioning member with a length the same as the diameter of the tower would apply a tension to the tower as soon as the tower starts to deform.

In the embodiment of FIG. 2a, the attachment points 22 are provided on the internal surface 14 of the tower wall 12. However, it should be noted that this is not essential and that other arrangements are possible such that any internal surface of the tower section is useful for attachment of the tensioning device. For example, attachment points may be provided on a radial flange extending inwardly from the tower wall 12 either somewhere between the top and bottom ends of the tower wall, or at the top and/or bottom ends, or on a flange that is a separate component from the tower wall, but affixed to it during construction. Such embodiments will be covered in the discussion that follows.

It should be noted that although the tensioning arrangement 18 shown in FIG. 2a is relatively simple, it may be suitable to achieve the intended result depending on the inherent radial stiffness of the tower. However, other embodiments are envisaged that use more sophisticated tensioning arrangements.

Figure 2B:
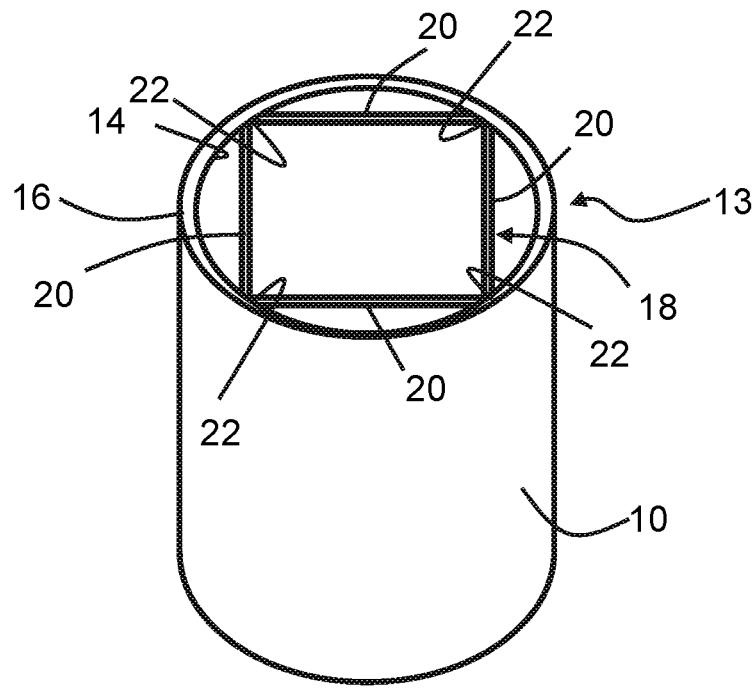

It may be the case that the tensioning arrangement 18 does not comprise members that span between diametrically opposed points on the internal surface tower section 10. FIG. 2b shows an embodiment of a tensioning arrangement 18 having four tensioning devices 20 arranged in a rectilinear formation, more specifically a square. The tensioning devices 20 forming the edges of the square formation span across the tower sections 10 as chords, rather than spanning between diametrically opposed points. In this embodiment, although the tensioning force will act on the attachment points 22 along the linear members 18, the overall force on the tower section 10 still acts towards the centre of the tower section 10, and therefore perpendicular to the tower wall 12, since each tensioning device 20 extends away from its respective attachment point 22 at an equivalent angle to its neighbouring tensioning device 20. At this point, it should be noted that only the configuration of the tensioning arrangement 18 in this embodiment is different. Therefore, the tensioning arrangement 18 may be affixed to the attachment points 22 in the same manner as the other embodiments.

Figure 2C:
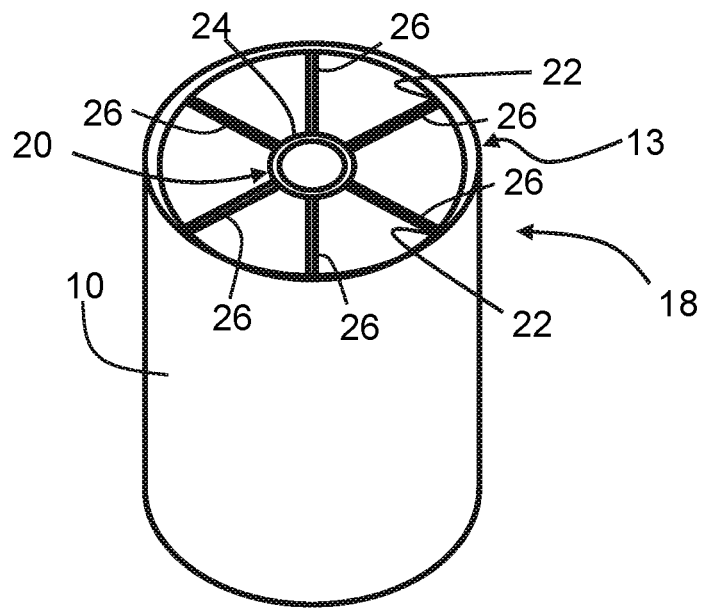

FIG. 2c shows a further embodiment of the tensioning arrangement 18, in which a tensioning device 20 has a so-called 'hub and spoke' configuration. As such, the tensioning device 20 comprises a central hub 24, from which radiate a plurality of arms or spokes 26. Here, the tensioning device 20 comprises six spokes 26 extending between the central hub 24 and respective attachment points 22 (only two of which are labelled in FIG. 2c). The hub 24 and the spokes may be the same or different material. For example, the hub 24 may be a rigid ring of metal or composite, and the spokes may be fabric straps. Although six spokes are shown in this embodiment, it is envisaged that at least three spokes should be provided in order to result in a balanced radial tension on the tower section. Again, in a three-spoked embodiment, it is envisaged that angularly equi-spaced attachment points 22 would provide the most radially balanced tension. So, each attachment point 22 could be spaced from neighbouring attachment points by 120 degrees. Other arrangements would be possible, however.

In in embodiments of FIGS. 2a to 2c, the tensioning devices 20 may be attached to the respective attachment points 22 in any way suitable to affix them in place such that the tension applied by the tensioning devices 20 causes an inward radial force to act on the tower section 10 thereby improving its radial stiffness and providing better control over the ovality of the tower section. Some variants will now be described in more detail with reference to FIGS. 3a to 3c.

Figure 3A:
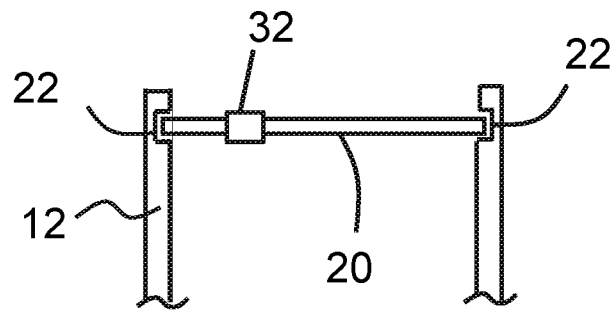

In one embodiment, as shown in FIG. 3a, the attachment points 22 may take the form of bores or holes formed in the tower wall 12 within which an end of a respective tensioning device 20 is received. One option is for the ends of the tensioning device 20 to be provided with external threads that can be screwed into complementary internally threaded holes. Another option is for the ends of the tensioning devices 20 to be mechanically bonded to the holes by way of a suitable technique, for example with adhesive or by welding.

Figure 3B:
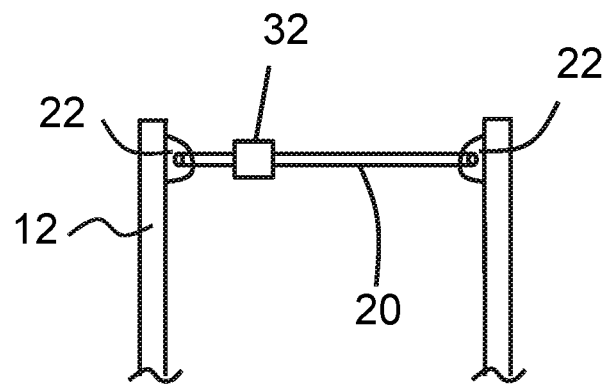

In another embodiment, as shown in FIG. 3b, the attachment points 22 may also take the form of brackets to which the tensioning device 20 is attached. Any suitable mechanical fastening system may be used, such as bolts or welding. The brackets may either be integral with or removably attached to the tower section 10.

The bolts may be attached to flanges that affixes to the tower section. More specifically, flanges at the open end of the tower section. The flanges are equipped with a plurality of holes for the bolts that hold the tower section to the foundation or another tower section upon assembly (not shown). The holes are vacant during until assembly and it is therefore convenient to use bolts temporarily inserted in the holes to temporarily attach the brackets to the tower section.

Figure 3C:
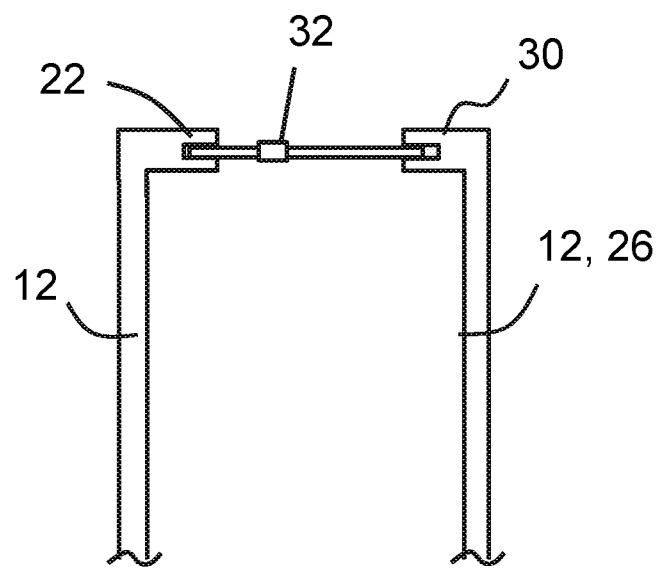

In a further embodiment, as shown in FIG. 3c, the tensioning arrangement 18 may span between attachment points 22 that are provided in a radially inward facing surface of a flange 30 of the tower section 10 rather than being provided in the cylindrical tower wall 12.

In the above embodiments, the tensioning devices 20 are configured to apply a tension between opposed associated attachment points 22. As the skilled person will appreciate, this may be achieved in various ways. For example, a fabric strap will inherently apply tension if it is stretched as it is connected to the attachment points. In other embodiments, however, the tensioning device 20 may be provided with a tensioning mechanism, as shown schematically in FIGS. 3a to 3c by the numeral '32'.

The tensioning mechanism 32 may generate some or all of the tension that is applied by the tensioning device 20 between the opposed attachment points 22. The configuration of the tensioning mechanism 32 may depend on the material from which the tensioning device 20 is made. For example, if the tensioning device 20 is a steel rod, a turnbuckle or other screw-based tensioning device may be an appropriate option to apply sufficient tension. Alternatively, other more complicated variants may be used, such as a tensioning system using hydraulic or electric actuators. If the tensioning device 20 comprises fabric straps, then the at least one tensioning mechanism 32 may take the form of a windlass-style ratchet.

It should be appreciated that it is advantageous for the tension applied to the tensioning device 20 by the tensioning mechanism 32 to be adjustable. In particular, where a hydraulic tensioning system is used as the tensioning mechanism 32 the hydraulic tensioning system may automatically adjust the tension applied by the tensioning device 20. This allows the tensioning device 20 to respond to and therefore compensate for environmental conditions to adjust the support provided to the tower section 10, and therefore the tower 4, of the wind turbine 2. As an example, if wind speeds are high in the area around the wind turbine 2, the hydraulic tensioning system may increase the tension applied to the tensioning device 20 to increase the stiffening effect on the tower section 10.

Figure 4:
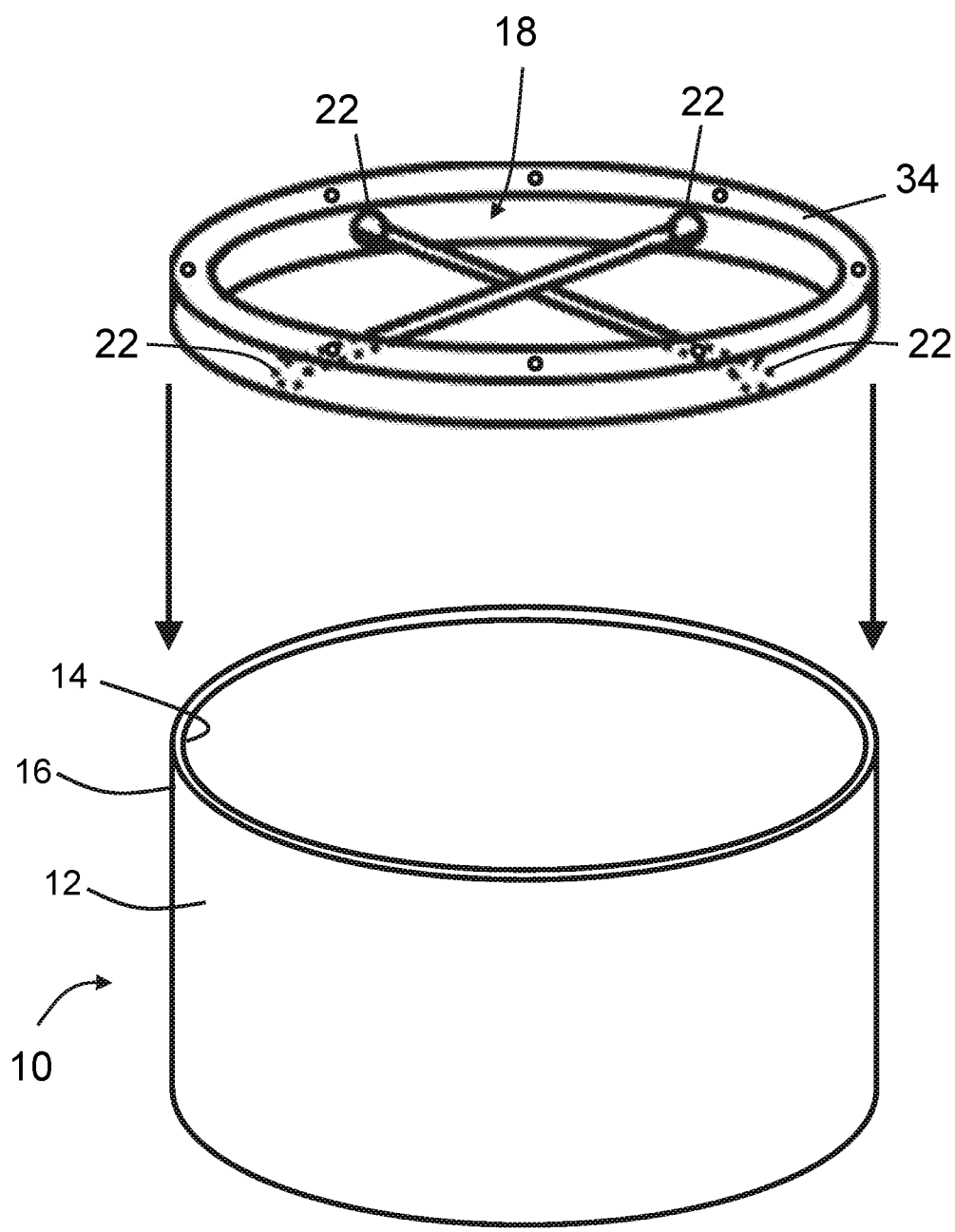

A final embodiment is shown in FIG. 4, in which parts that are common with the embodiments described above are denoted with the same reference numerals. In this embodiment, the tensioning arrangement 18 is connected to attachment points 22 provided in an additional component, here a flange component 34, that is separate to the tower section 10.

The tensioning arrangement 18 is shown as comprising a pair of linear members that are arranged into an x-shaped formation so as to cross each other perpendicularly at the centre of the flange component 34. Other forms of tensioning arrangement will also be suitable, as discussed in the previous embodiments.

As is shown, the flange component 34 is separate to the tower section 10 and may be affixed thereto by appropriate methods, for example by welding. It may also be fixed to an integral flange member of the tower section 10.

It will therefore be appreciated that a benefit of this embodiment is that the flange component 34 including the tensioning arrangement 18 may be retrofitted to tower sections to improve their radial stiffness.

Figure 5:
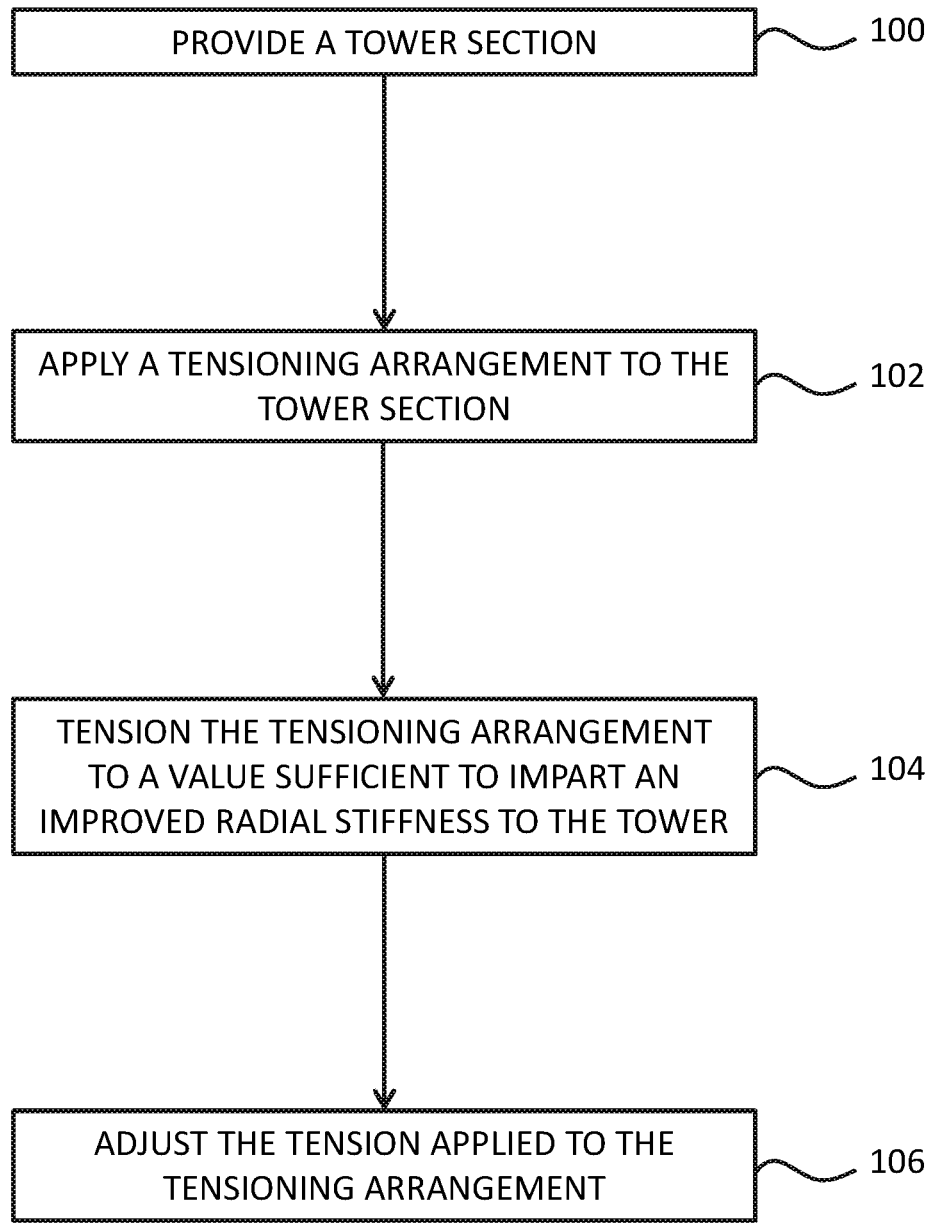
FIG. 5 is a flowchart of an aspect of the invention.

The embodiments of the invention may also be expressed as a method, as is illustrated by the flowchart in FIG. 5.

At step 100, a tower section is provided. For example, a tower section 10 may be manufactured and transported to the installation site before being equipped with the tensioning arrangement 18. It is also envisaged that a tower section 10 may be fabricated and then equipped with the tensioning arrangement 18 before the tower section 10 is transported.

In either scenario discussed above, at step 102 a tensioning arrangement 18 according to the embodiments discussed above is applied to the tower section 10 at the appropriate time when it is determined that an increase in the radial stiffness of the tower section 10 is required. It will be appreciated that this will be dependent on the design characteristics of the tower section 10 and whether the tower section 10 has sufficient radial stiffness to be transported without the tensioning arrangement 18 attached.

In this step, it should be noted that the application of the tensioning arrangement to the tower section 10 may be achieved by attaching one or more tensioning devices 20 directly to the tower section 10, for example to the tower wall 12 as discussed above with reference to FIGS. 2a-2c and FIGS. 3a-3c, or by attaching one or more tensioning devices 20 to a separate component, for example a tower flange as discussed above with reference to FIG. 4.

In a further step (step 104), the tensioning arrangement 18 is tensioned to a value that is determined to be sufficient to impart an improved radial stiffness to the tower. As discussed above with reference to the illustrated embodiments, the tension applied by the tensioning arrangement 18 depends on the configuration of the tensioning device which in turn may depend on the radial stiffness requirements of the tower. For example, in some embodiments, a resilient strap connected between a pair of attachment points may provide sufficient radial stiffness. In other scenarios, however, a tensioning device in the form of a steel rod may require a turnbuckle-style tensioning mechanism to apply a sufficient tension. Furthermore, as mentioned above, in embodiments featuring a steel rod as the tensioning device, that steel rod may be configured to be precisely the same length as the diameter of the tower such that attaching the rod to the attachment points imparts little tension. Tension will then be generated in response to attempted deformation of the tower section.

Optionally, the tension in the tensioning arrangement may be adjusted at step 106.

The illustrated embodiments discussed above demonstrate various technical implementations of the inventive concept. However, it will be appreciated by the skilled person that other variations may be made apart from those detailed above and yet still fall within the scope of the appended claims. It will also be appreciated by the skilled person that the invention may relate to tower structures other than those for wind turbines.

The invention claimed is:

1. A tower section for a wind turbine, wherein the tower section comprises:
   a tensioning arrangement located within a radial bounds of the tower section and arranged substantially perpendicular to a central axis of the tower section, the tensioning arrangement comprising one or more tensioning devices attached to three or more attachment points associated with the tower section, wherein the three or more attachment points are located proximate to an end of the tower section,
   wherein the one or more tensioning devices are under tension and provide radial stiffness to the tower section, and
   wherein the tensioning arrangement is removable from the tower section.

2. The tower section of claim 1, wherein the three or more attachment points are located in a same or nearly the same transverse plane of the tower section, that transverse plane being perpendicular to the central axis of the tower section.

3. The tower section of claim 1, wherein at least one of the attachment points is associated with an interior surface of the tower section.

4. The tower section of claim 1, wherein at least one of the three or more attachment points is provided by an additional component separate to the tower section.

5. The tower section of claim 4, wherein the additional component is a flange that affixes to the tower section.

6. The tower section of claim 1, wherein at least one of the tensioning devices is configured such that the tension applied between at least two of the three or more attachment points is adjustable.

7. The tower section of claim 1, wherein at least one of the tensioning devices is a linear member that spans between two of the attachment points.

8. The tower section of claim 1, wherein at least one of the tensioning devices spans between two diametrically opposed attachment points.

9. The tower section of claim 1, wherein at least one of the tensioning devices spans between a pair of attachment points so as to form a chord with respect to the tower section.

10. The tower section of claim 1, wherein at least one of the tensioning devices includes an adjusting mechanism, and wherein the adjusting mechanism allows for the tension applied by the respective tensioning device to the tower section to be adjusted.

11. The tower section of claim 10, wherein the adjusting mechanism is selected from one or more of the group of: a turnbuckle; a screw adjuster; a hydraulic adjuster; an electrically-driven adjuster.

12. The tower section of claim 1, wherein the three or more attachment points are brackets, and wherein the tensioning devices are attached to the brackets.

13. The tower section of claim 12, wherein the brackets are removably attached to the tower section.

14. The tower section of claim 13, wherein the brackets are attached to the tower section with bolts.

15. The tower section of claim 14, wherein the bolts are attached to a flange that affixes to the tower section.

16. The tower section of claim 1, wherein the tensioning arrangement is located within the tower section between the end of the tower section and an opposing end of the tower section.

17. The tower section of claim 1,
   wherein at least one of the tensioning devices is attached to an attachment point at each end of the tensioning device.

18. A method for assembling a tower for a wind turbine, the method comprising:
   providing a tower section;
   locating a removable tensioning arrangement within a radial bounds of the tower section, the tensioning arrangement arranged substantially perpendicular to a central axis of the tower section;
   attaching the removable tensioning arrangement including at least one tensioning device between at least three attachment points associated with the tower section and located proximate to an end thereof; and
   applying tension to the at least one tensioning device so as to provide radial stiffness to the tower section.

19. The method of claim 18, wherein attaching the at least one tensioning device between the at least three attachment points associated with the tower section comprises:
   attaching the at least one tensioning device to an additional component via the at least three attachment points thereof; and
   attaching the additional component to the tower section.

20. The method of claim 19, wherein the additional component is a flange component of the tower.

21. The method of claim 18, wherein the method further comprises adjusting the tension applied to the at least one tensioning device.

22. The method of claim 18, wherein, following the step of applying tension to the at least one tensioning device, the method comprises a step of lifting the tower section into a position for assembly.

23. The method of claim 22, wherein, following the step of lifting the tower section into position for assembly the method comprises a step of attaching the tower section to one of a foundation or another tower section, and a following step of removing the tensioning arrangement.

24. The method of claim 18, wherein the method further comprises:
   locating the tensioning arrangement within the tower section between the end of the tower section and an opposing end of the tower section.

25. The method of claim 18, wherein the at least three attachment points are located in a same or nearly the same transverse plane of the tower section, that transverse plane being perpendicular to the central axis of the tower section.

26. A method for assembling a tower for a wind turbine, the method comprising:
   providing a tower section;
   locating a tensioning arrangement within a radial bounds of the tower section, the tensioning arrangement arranged substantially perpendicular to a central axis of the tower section;
   attaching the tensioning arrangement including at least one tensioning device between at least three attachment points associated with the tower section and located proximate to an end thereof;
   applying tension to the at least one tensioning device so as to provide radial stiffness to the tower section;
   lifting the tower section into a position for assembly;
   attaching the tower section to one of a foundation or another tower section; and
   removing the tensioning arrangement.

* * * * *